United States Patent
Keeni (10) Patent No.: US 8,955,049 B2
(45) Date of Patent: Feb. 10, 2015

(54) METHOD AND A PROGRAM FOR CONTROLLING COMMUNICATION OF TARGET APPARATUS

(75) Inventor: Glenn Mansfield Keeni, Miyagi (JP)

(73) Assignee: Cyber Solutions Inc., Miyagi (JP)

( * ) Notice: Subject to any disclaimer, the term of this patent is extended or adjusted under 35 U.S.C. 154(b) by 172 days.

(21) Appl. No.: 13/812,994

(22) PCT Filed: Feb. 18, 2011

(86) PCT No.: PCT/JP2011/053489
§ 371 (c)(1),
(2), (4) Date: May 24, 2013

(87) PCT Pub. No.: WO2012/014509
PCT Pub. Date: Feb. 2, 2012

(65) Prior Publication Data
US 2014/0165143 A1    Jun. 12, 2014

(30) Foreign Application Priority Data
Jul. 30, 2010    (JP) ................................. 2010-172126

(51) Int. Cl.
*H04L 29/06* (2006.01)
*H04L 12/46* (2006.01)
*H04L 29/12* (2006.01)

(52) U.S. Cl.
CPC .............. *H04L 63/10* (2013.01); *H04L 12/462* (2013.01); *H04L 63/101* (2013.01); *H04L 63/1441* (2013.01); *H04L 61/103* (2013.01)
USPC .......................................................... 726/3

(58) Field of Classification Search
CPC ......... H04L 63/08; H04L 63/10; H04L 63/20; H04L 29/06; H04L 63/0428
USPC .......................................................... 726/3
See application file for complete search history.

(56) References Cited

U.S. PATENT DOCUMENTS 5,465,251 A  *  11/1995  Judd et al. ..................... 370/351
5,926,463 A  *   7/1999  Ahearn et al. ................ 370/254

(Continued)

FOREIGN PATENT DOCUMENTS

JP    2004-185498    7/2004
JP    2005-079706    3/2005

(Continued)

OTHER PUBLICATIONS

"Configuring and Monitoring Port Security" (ftp://ftp.hp.com/pub/networking/software/Security-Oct2005-59906024-Chap09-Port_Security.pdf).*

(Continued)

*Primary Examiner* — Jason K. Gee
*Assistant Examiner* — Sanchit Sarker
(74) *Attorney, Agent, or Firm* — Young & Thompson (57) ABSTRACT

Disclosed are a method and program for controlling communication of the target apparatus, specifically, blocking the communication of the target apparatus immediately and certainly in case where illegal connection to the target apparatus is detected in the network arranged one or more Layer-2 switches. The network monitoring manager H carries out blocking communication of the target apparatus immediately and certainly by detecting automatically the Layer-2 switch port connected to the communication apparatus, that is identified as the target apparatus including illegal connection, based on the MvP table, and blocking the communication of the target apparatus by administratively disabling the Layer-2 switch port connected to the target apparatus, in case where the network monitoring manager H detects illegal connection to the communication apparatus in the network.

8 Claims, 5 Drawing Sheets

(56) References Cited

U.S. PATENT DOCUMENTS

| | | | |
|---|---|---|---|
| 7,552,478 B2 | 6/2009 | Seki et al. | |
| 7,639,684 B2 * | 12/2009 | Lim et al. | 370/390 |
| 8,212,073 B2 | 7/2012 | Kasowski | |
| 2002/0073338 A1 * | 6/2002 | Burrows et al. | 713/201 |
| 2005/0050365 A1 | 3/2005 | Seki et al. | |
| 2005/0220036 A1 * | 10/2005 | Sugitani et al. | 370/252 |
| 2006/0161775 A1 * | 7/2006 | O'Brien et al. | 713/170 |
| 2008/0253380 A1 * | 10/2008 | Cazares et al. | 370/395.53 |
| 2009/0028067 A1 * | 1/2009 | Keeni et al. | 370/254 |
| 2009/0048372 A1 | 2/2009 | Kasowski | |
| 2009/0172151 A1 * | 7/2009 | Davis | 709/224 |
| 2009/0178128 A1 * | 7/2009 | Chiba et al. | 726/7 |
| 2009/0180471 A1 * | 7/2009 | Bohra et al. | 370/389 |
| 2014/0165143 A1 * | 6/2014 | Keeni | 726/3 |

FOREIGN PATENT DOCUMENTS

| | | |
|---|---|---|
| JP | 2005-198090 | 7/2005 |
| JP | 2006-148255 | 6/2006 |
| JP | 2006148255 A * | 6/2006 |
| JP | 2007-514811 | 6/2007 |
| JP | 2009-253461 | 10/2009 |
| WO | WO 2006/118203 | 11/2006 |

OTHER PUBLICATIONS

International Search Report, PCT/JP2011/053489, Mar. 15, 2011.

* cited by examiner

METHOD AND A PROGRAM FOR CONTROLLING COMMUNICATION OF TARGET APPARATUS

TECHNICAL FIELD

The present invention relates to a method and a program for controlling communication of a target apparatus based on port information of one or more Layer-2 switches connected to communication apparatuses in a network.

BACKGROUND TECHNOLOGY

Recently, with increasing scale and complexity of networks, network security has become an indispensable task and a lot of research and development on technologies to prevent unauthorized access is being carried out.

For instance, "Patent document 1" discloses an access control apparatus, which blocks the communication by transmitting false ARP (Address Resolution Protocol) response packet if the communication between nodes that are not permitted according to the access policy is detected. Especially the access control apparatus controls "permitted" or "not permitted" communication between nodes independent of hardware or software even when the ARP-table of the unauthorized node has been configured statically.

"Patent document 2" discloses a system for preventing illegal connections, which prevents connections to private servers and other nodes in the same subnet from an unauthorized node not permitted based on an approval list and prevent connections to the external network via routers etc from the unauthorized node based on the approval list, by registering the MAC addresses of nodes permitted to access the network to the approval list and transmitting ARP packets with a false MAC-address to the unauthorized node.

"Patent document 3" discloses an apparatus for preventing illegal connections, which prevents unauthorized network access by transmitting ARP-request packets successively to all registered nodes, judging whether the profile of the node has been already registered based on the ARP-reply packet received from the node in response to the ARP-request packet, and transmitting disturb-messages which shows that the node includes multiple profiles in a case where it is judged that the node has not been registered.

"Patent document 4" discloses network map creating method, which detects the inter connections of the OSI Reference Model Layer-2 switches (inter-switch connections) and the connections of computers to the OSI Reference Model Layer-2 switches (switch-terminal connections) in the network in which there are one or more OSI Reference Model layer-2 switches using a new algorithm. Especially the new algorithm shows the method of generating MvP table as mapping table with MAC address and port information of Layer-2 switches based on port information of Layer-2 switches collected by network monitoring manager and detecting connections of Layer-2 switches and connections of computers to the Layer-2 switches in the network. The inventor of this invention is "Keeni, Glenn Mansfield" that is the same as the inventor in the present application. Likewise, the assignee of this invention is "CYBER SOLUTIONS INC." that is the same as the assignee in the present application.

[Patent document 1] Japanese Patent Laid-Open No. 2004-185498
[Patent document 2] Japanese Patent Laid-Open No. 2005-079706
[Patent document 3] Japanese Patent Laid-Open No. 2005-198090
[Patent document 4] Japanese Patent Laid-Open No. 2007-514811

DISCLOSURE OF THE INVENTION

Problem to be Solved by the Invention

However, in these invention described in patent document 1-3, there are unsolvable problems shown below.
(i) It is difficult to block communication of the target apparatus with multiple IP addresses immediately and certainly, because blocking communication of the target apparatus using IP address.
(ii) It is impossible to block communication of the target apparatus immediately and certainly, because the ARP table of the target apparatus is overwritten with the latest data (correct ARP-reply packet) received after receiving the false ARP-reply packet transmitted to block communication of the target apparatus due to delay in network.
(iii) It is impossible to block communication of the target apparatus immediately and certainly, because the target apparatus can transmit data to other apparatus without generating an ARP-request packet in case where the ARP-table of the target apparatus has been set statically to change from "not permitted" to "permitted".

Meanwhile, Layer-2 switch as one of the apparatus which relays packets in network judges the forwarding address using the destination MAC address contained in a packet. Therefore, it is a positive method to detect the Layer-2 switch port connected to the target apparatus and to disable the Layer-2 switch port connected to the target apparatus in order to block communication of the target apparatus with multiple IP addresses immediately and certainly.

The present invention proposes a method and a program for detecting the Layer-2 switch port connected to the target apparatuses in network using the MvP table described in patent document 4, and blocking the communication of the target apparatus by administratively disabling the Layer-2 switch port connected to the said target apparatus.

That is, the present invention provides the method and the program for controlling communication of the target apparatus, specifically, blocking the communication of the target apparatus immediately and certainly in case where illegal connection to the target apparatus is detected in the network arranged one or more Layer-2 switches, and unblocking the communication of the target apparatus in case where the communication of the Layer-2 switch port connected to the said target apparatus has been blocked.

Means to Solve the Problem

In one embodiment, a method for blocking communication of a target apparatus based on port information of one or more Layer-2 switches connected to communication apparatuses in a network includes:

a first step of generating a MvP table consisting of a mapping table M1 and a mapping table M2 based on management information collected from the Layer-2 switches by network monitoring manager, wherein said mapping table M1 provides a mapping between MAC address $M(C_i)$ of the target apparatus $C_i$ ($1 \leq i \leq$ total number of communication apparatuses in network) and port information set $Row\{M(C_i)\}$ of Layer-2 switches $S_j$ ($1 \leq j \leq$ total number of Layer-2 switches) that detected said MAC address $M(C_i)$, and said mapping table M2 provides a mapping between MAC address M(Sj) of Layer-2 switches Sj and port information set Row{M(Sj)} of Layer-2 switches Sj that detected said MAC address M(Sj);

a second step of normalizing the MvP table, wherein, if the same port is seen in both the port information set Row{M(Ci)} of the mapping table M1 and the port information set Row{M (Sj)} of the mapping table M2, the MvP table is normalized by deleting elements of ports P(Sj,n) (1≤n≤total number of ports of Layer-2 switches Sj) corresponding to the same port from the port information set Row{M(Sj)} of the mapping table M2;

a third step of identifying the Layer-2 switch port connected to said target apparatus Ci based on the MvP table normalized in the second step;

a fourth step of blocking the communication of said target apparatus Ci by administratively disabling the Layer-2 switch port connected to said target apparatus Ci based on the Layer-2 switch port identified in the third step.

In another embodiment, the third step includes:

(1) Identifying the Layer-2 switches Sj as the Layer-2 switch connected to the communication apparatus Ci in case where the port information set Row{M(Sj)} of the mapping table M2 is empty;

(2) Identifying the port P(Sj,n) as the port connected to the communication apparatus Ci in the case where the element of the port P(Sj,n) corresponding to the port of the Layer-2 switches Sj identified in (1) is seen in the port information set Row{M(Ci)} of the mapping table M1.

In a further embodiment, the method according further includes:

a fifth step of unblocking the communication of said target apparatus Ci by administratively enabling the Layer-2 switch port connected to said target apparatus Ci, in case where the Layer-2 switch port connected to said target apparatus Ci has been disabled.

Another embodiment includes a computer program embodied on a non-transitory computer readable medium of network monitoring manager to execute processes for blocking communication of a target apparatus based on port information of one or more Layer-2 switches connected to communication apparatuses in a network, comprising of:

a first executable process for generating a MvP table consisting of a mapping table M1 and a mapping table M2 based on management information collected from the Layer-2 switches by network monitoring manager, wherein said mapping table M1 provides a mapping table between MAC address M(Ci) of the target apparatus Ci (1≤i≤total number of communication apparatuses in network) and port information set Row{M(Ci)} of Layer-2 switches Sj (1≤j≤total number of Layer-2 switches) that detected said MAC address M(Ci), and said mapping table M2 provides a mapping table between MAC address M(Sj) of Layer-2 switches Sj and port information set Row{M(Sj)} of Layer-2 switches Sj that detected said MAC address M(Sj);

a second executable process for normalizing the MvP table, wherein, if the same port is seen in both the port information set Row{M(Ci)} of the mapping table M1 and the port information set Row{M(Sj)} of the mapping table M2, normalizing the MvP table by deleting elements of ports P(Sj,n) (1≤n≤total number of ports of Layer-2 switches Sj) corresponding to the same port from the port information set Row{M(Sj)} of the mapping table M2;

a third executable process for identifying the Layer-2 switch port connected to said target apparatus Ci based on the MvP table normalized in the second executable process;

a fourth executable process for blocking the communication of said target apparatus Ci by administratively disabling the Layer-2 switch port connected to said target apparatus Ci based on the Layer-2 switch port identified in the third executable process.

Further the third executable process can include:

(1) Identifying the Layer-2 switches Sj as the Layer-2 switch connected to the communication apparatus Ci in case where the port information set Row{M(Sj)} of the mapping table M2 is empty;

(2) Identifying the port P(Sj,n) as the port connected to the communication apparatus Ci in the case where the element of the port P(Sj,n) corresponding to the port of the Layer-2 switches Sj identified in (1) is seen in the port information set Row{M(Ci)} of the mapping table M1.

Additionally, the computer program can include:

a fifth executable process for unblocking the communication of said target apparatus Ci by administratively enabling the Layer-2 switch port connected to said target apparatus Ci, in case where the Layer-2 switch port connected to said target apparatus Ci has been disabled.

Effect of the Invention

The method produces the effect of being able to carry out detecting automatically the Layer-2 switches ports connected to communication apparatuses, and being able to carry out blocking communication of the target apparatus immediately and certainly by administratively disabling the Layer-2 switch port connected to the target apparatus in case where illegal connection to the target apparatus is detected in the network. Therefore, the invention produces the effect of improving operational efficiency of network management, and being able to strengthen security in the network.

The embodiments produce the effect of being able to carry out detecting easily the Layer-2 switches ports connected to communication apparatuses in the network.

The method can also produce the effect of being able to carry out unblocking the communication of the target apparatus immediately and certainly by administratively enabling the Layer-2 switch port connected to the target apparatus, for example, after an investigation into the cause of the illegal connection to the target apparatus is completed and an appropriate treatment according to the investigation result is completed, in case where the Layer-2 switch port connected to the target apparatus has been disabled.

EXPLANATION OF CODES USED IN THE DIAGRAMS

H Network monitoring manager
S1-S3 Layer-2 switch

SX Non-intelligent Hub
C1-C6 Communication apparatus

BEST MODE FOR CARRYING OUT THE
INVENTION

In the following, the prototype embodying best mode of the present invention is described with reference to diagrams. However, the present invention is not limited to this prototype.

1. Execution Example 1

Figure 1:
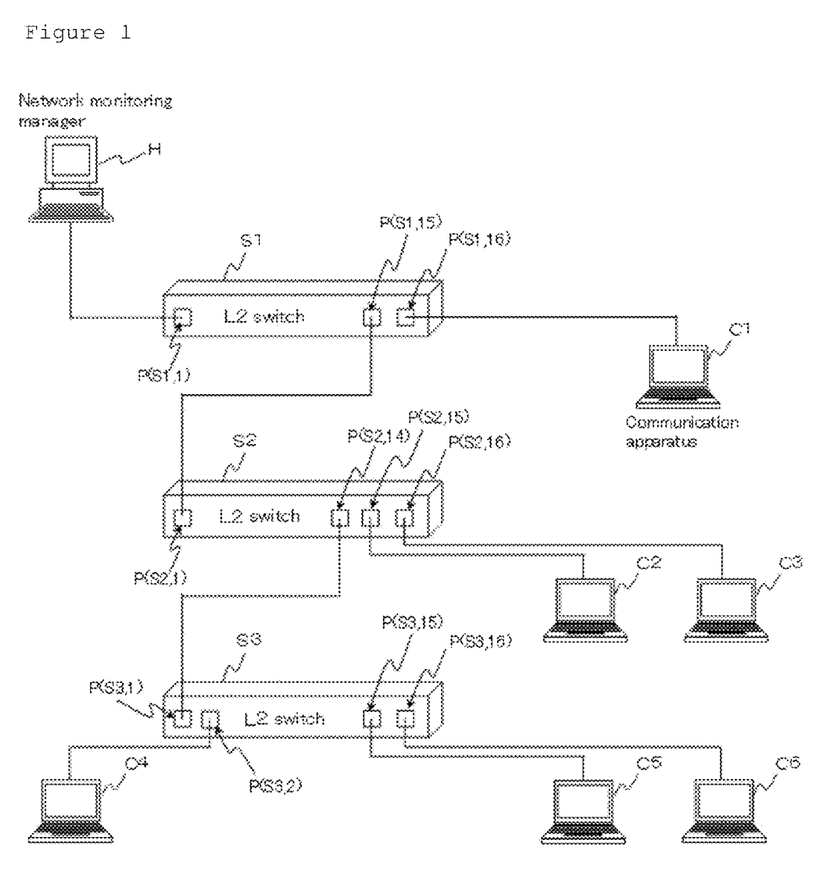
FIG. 1 shows an example of network configuration for carrying out "Execution Example 1" of the present invention.

The method and the program for carrying out "Execution Example 1" of the present invention are concretely explained with reference to the network configuration shown in FIG. 1. FIG. 1 shows an example of the network configuration of the present invention, proposing the method and the program for controlling the communication of the target apparatus, specifically, blocking and unblocking the communication of the target apparatus.

As shown in FIG. 1, network monitoring manager H in which SNMP (Simple Network Management Protocol) manager is implemented, Layer-2 switches S1, S2, S3 in which SNMP agent is implemented, communication apparatus C1 connected to Layer-2 switch S1, communication apparatuses C2, C3 connected to Layer-2 switch S2, communication apparatuses C4, C5, C6 connected to Layer-2 switch S3 exist in the network. Also, nth port of Layer-2 switches Sj (1≤j≤3) is described as P(Sj,n) (1≤n≤total number of port of Layer-2 switches Sj).

The port P(S1,15) of Layer-2 switch S1 is connected to the port P(S2,1) of Layer-2 switch S2. Similarly, the port P(S2,14) of Layer-2 switch S2 is connected to the port P(S3,1) of Layer-2 switch S3.

The network monitoring manager H carries out blocking communication of the target apparatus Ci immediately and certainly by detecting automatically the Layer-2 switch port connected to the communication apparatus Ci, that is identified as the target apparatus including illegal connection, based on the MvP table, and blocking the communication of the target apparatus Ci by administratively disabling the Layer-2 switch port connected to the target apparatus Ci, in case where the network monitoring manager H detects illegal connection to the communication apparatus Ci in the network.

For example, the network monitoring manager H detects the following illegal connections to the communication apparatus Ci, and identifies the communication apparatus Ci as the target apparatus.
(i) Detecting that "not permitted" MAC address or IP address included in packets transmitted from the communication apparatus Ci exists in the network.
(ii) Detecting that the amount of traffic of the communication apparatus Ci monitored by the network monitoring manager H reaches a pre-specified threshold.
(iii) Detecting that packets transmitted from the communication apparatus Ci not permitted based on an access policy exist in the network.

In addition, we omit describing about the method of detecting the said illegal connection to the communication apparatus Ci from the specification of the present invention.

The network monitoring manager H carries out blocking the communication of the target apparatus Ci immediately and certainly by identifying the communication apparatus Ci including illegal connection as the target apparatus, detecting the Layer-2 switch port connected to the target apparatus Ci based on the MvP table, and blocking the communication of the target apparatus Ci by administratively disabling the Layer-2 switch port connected to the target apparatus Ci.

Figure 2:
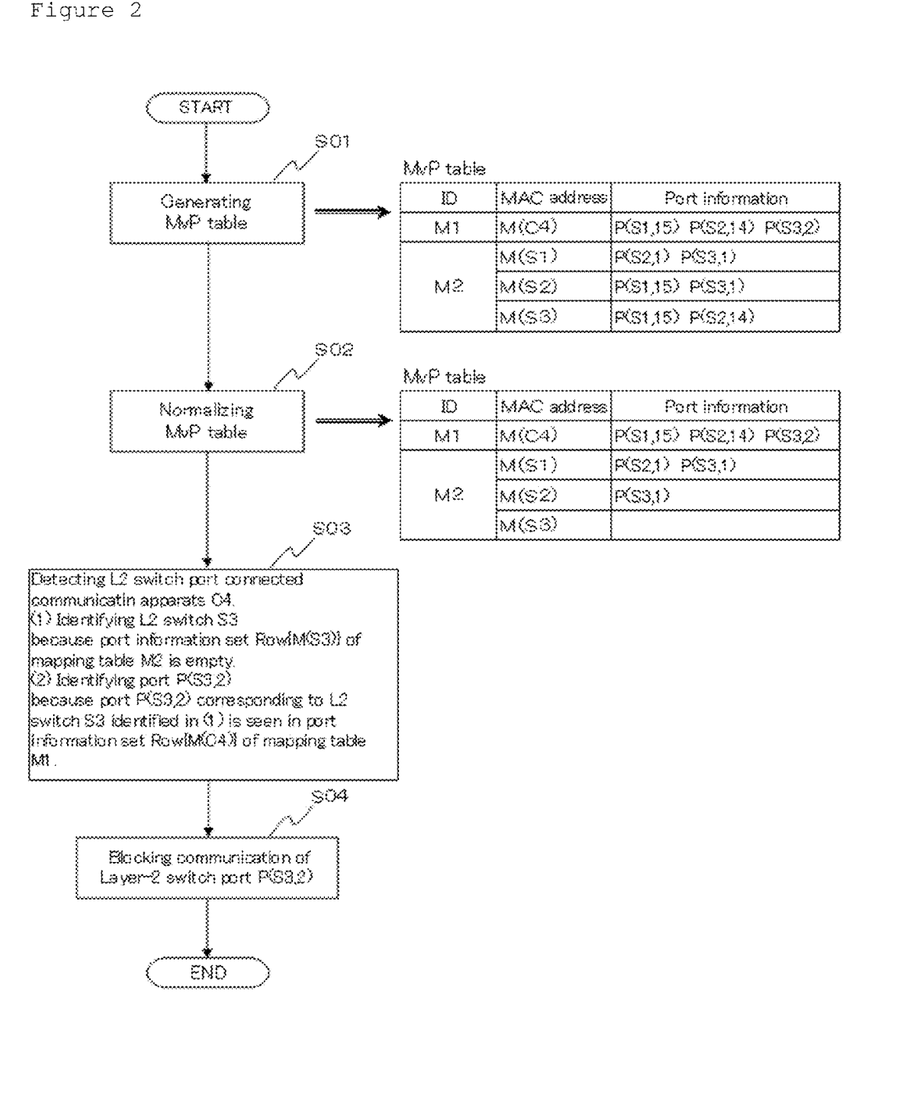
FIG. 2 shows an example of controlling to block communication of the target apparatus C4 in the network configuration that is shown in FIG. 1.

Next, the method and the program for carrying out "Execution Example 1" of the present invention are concretely explained with reference to the flowchart shown in FIG. 2. FIG. 2 shows an example of blocking the communication of the target apparatus C4 in case where the network monitoring manager H detects the illegal connection to the communication apparatus C4, and identifies the communication apparatus C4 as the target apparatus.

In step S01, the MvP table consisting of the mapping table M1 and the mapping table M2 based on management information collected from Layer-2 switches Sj by the network monitoring manager H is generated, wherein the mapping table M1 provides a mapping between MAC address M(C4) of the communication apparatus C4 and port information set Row{M(C4)} of Layer-2 switches Sj (1≤j≤3) that detected the said MAC address M(C4), and the mapping table M2 provides a mapping between MAC address M(Sj) of Layer-2 switches Sj and port information set Row{M(Sj)} of Layer-2 switches Sj that detected the said MAC address M(Sj).

As shown in FIG. 2, the mapping table M1 provides a mapping between MAC address M(C4) of the communication apparatus C4 and port information set Row{M(C4)}={P(S1,15), P(S2,14), P(S3,2)}.

Also, the mapping table M2 provides
a mapping between MAC address M(S1) of Layer-2 switch S1 and port information set Row {M(S1)}={P(S2,1), P(S3,1)},
a mapping between MAC address M(S2) of Layer-2 switch S2 and port information set Row {M(S2)}={P(S1,15), P(S3,1)}, and
a mapping between MAC address M(S3) of Layer-2 switch S3 and port information set Row {M(S3)}={P(S1,15), P(S2,14)}.

In addition, the network monitoring manager H collects the port information of Layer-2 switch Sj by making a request with IP address to Layer-2 switch Sj in which SNMP agent is implemented, receiving SNMP management information (MIB1 specified in RFC1156, MIB2 specified in RFC1213, and IF-MIB specified in RFC2863) from Layer-2 switch Sj, and detecting MAC address included in header of packets that have passed through arbitrary ports P(Sj,n) of Layer-2 switch Sj based on the SNMP management information.

In addition, in case where the network monitoring manager H has not stored the IP address of Layer-2 switch Sj, the network monitoring manager H makes a request with IP address to all elements whose IP address is stored in the network monitoring manager H, receives SNMP management information from the elements in which SNMP agent is implemented, and detects the IP address of Layer-2 switch Sj based on the SNMP management information.

Next, In step S02, in case where the same port information is seen in both the port information set Row{M(C4)} of the mapping table M1 and the port information set Row{M(Sj)} of the mapping table M2, the MvP table is normalized by deleting elements of ports P(Sj,n) corresponding to said port information from the port information set Row{M(Sj)} of the mapping table M2.

In step S02, normalizing process is performed as follows. Anything is not deleted from the port information set Row{M(S1)} of the mapping table M2, because the same port information is not seen in both the port information set Row{M(C4)} of the mapping table M1 and the port information set Row{M(S1)} of the mapping table M2.

Also, the element of port P(S1,15) is deleted from the port information set Row{M(S2)} of the mapping table M2, because the element of the same port P(S1,15) is seen in both the port information set Row{M(C4)} of the mapping table M1 and the port information set Row{M(S2)} of the mapping table M2.

Also, the elements of port P(S1,15) and P(S2,14) are deleted from the port information set Row{M(S3)} of the mapping table M2, because the elements of the same port P(S1,15) and P(S2,14) are seen in both the port information set Row{M(C4)} of the mapping table M1 and the port information set Row{M(S3)} of the mapping table M2.

As shown in FIG. 2, the port information set Row{M(S3)} of the mapping table M2 is empty by normalizing process described above.

Next, In step S03, the Layer-2 switch S3 is identified as the Layer-2 switch connected to the communication apparatus C4 because the port information set Row{M(S3)} of the mapping table M2 is empty. Also, the port P(S3,2) is identified as the port connected to the communication apparatus C4 because the element of port P(S3,2) corresponding to the port information of the Layer-2 switches S3 identified above is seen in the port information set Row{M(C4)} of the mapping table M1.

Next, In step S04, the port P(S3,2) identified in step S03 is changed into disable state by administratively disabling the Layer-2 switch port P(S3,2) connected to the communication apparatus C4. For example, the network monitoring manager H executes the command for disabling the Layer-2 switch port P(S3,2). Thereby the communication of the communication apparatus C4 is blocked.

As clarified above, the method and the program for carrying out "Execution Example 1" of the present invention is able to carry out detecting automatically the port information of Layer-2 switch connected to the communication apparatus that is identified as the target apparatus including illegal connection, and to carryout blocking communication of the target apparatus immediately and certainly by executing the step S01-S04 described above in case where illegal connection to the communication apparatus is detected in the network.

In addition, in case where an investigation into the cause of the illegal connection to the target apparatus is completed and an appropriate treatment according to the investigation result is completed, the communication blocked state of the target apparatus that has been changed by executing the step S01-S04 described above must be removed. In this case, the blocked state of the target apparatus is removed by executing the step S05 instead of S04, wherein the command for disabling the Layer-2 switch port is executed in the step S05.

In addition, it is possible to execute the above steps by executing the computer program on the computer processor of the network monitoring manager H.

2. Execution Example 2

Figure 3:
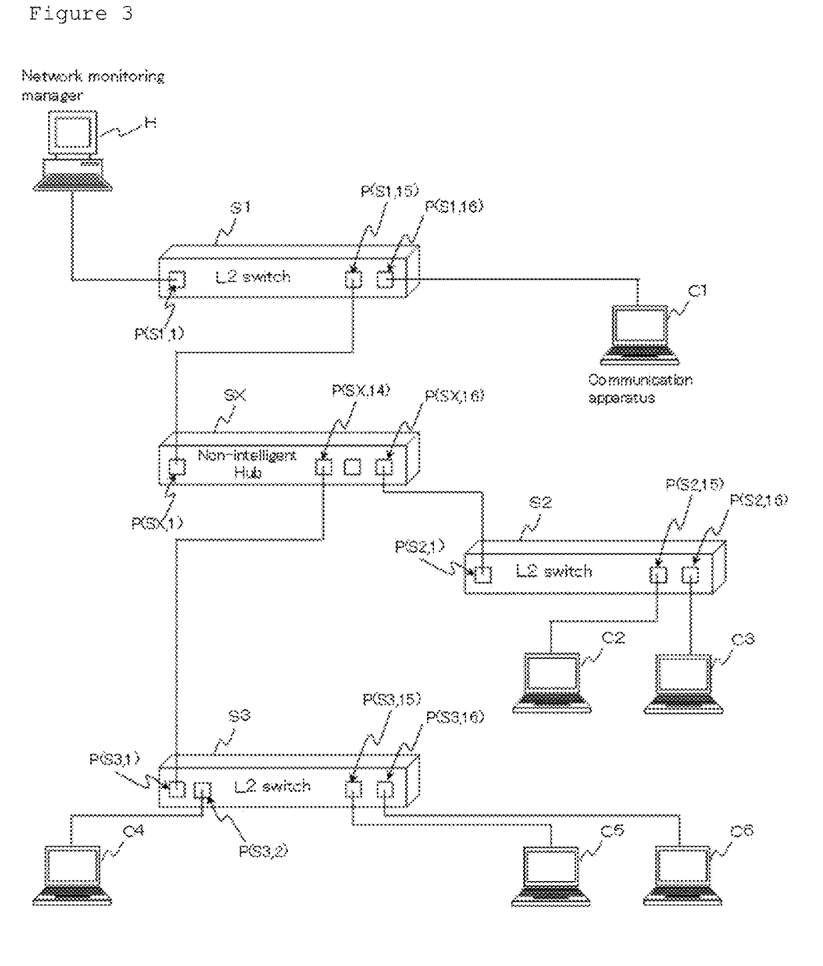
FIG. 3 shows an example of network configuration for carrying out "Execution Example 2" of the present invention.

The method and the program for carrying out "Execution Example 2" of the present invention are concretely explained with reference to the network configuration shown in FIG. 3. FIG. 3 shows an example of network configuration of the present invention, proposing the method and the program for controlling the communication of the target apparatus, specifically, blocking and unblocking the communication of the target apparatus, in case where a non-intelligent Hub that is not corresponding to SNMP exists in the network.

As shown in FIG. 3, the port P(S1,15) of Layer-2 switch S1 is connected to the port P(SX,1) of non-intelligent Hub SX. Similarly, the port P(SX,16) of non-intelligent Hub SX is connected to the port P(S2,1) of Layer-2 switch S2. Similarly, the port P(SX,14) of non-intelligent Hub SX is connected to the port P(S3,1) of Layer-2 switch S3.

In this case, it is possible to carry out detecting automatically the Layer-2 switches ports connected to communication apparatuses Ci and to carry out blocking communication of the target apparatus Ci immediately and certainly by basically executing steps described in FIG. 2.

Figure 4:
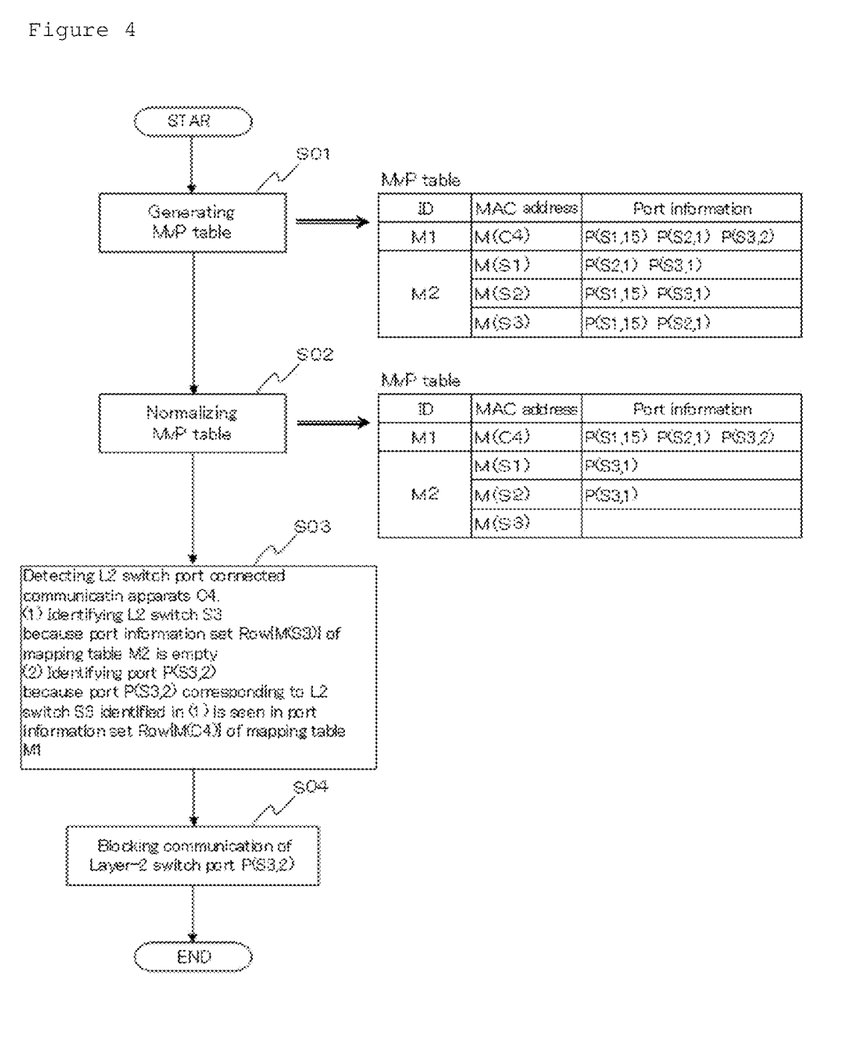
FIG. 4 shows an example of controlling to block communication of the target apparatus C4 in the network configuration that is shown in FIG. 2.

Next, the method and the program for carrying out "Execution Example 2" of the present invention are concretely explained with reference to the flowchart shown in FIG. 4. FIG. 4 shows an example of blocking the communication of the target apparatus C4 in case where the network monitoring manager H detects the illegal connection to the communication apparatus C4, and identifies the communication apparatus C4 as the target apparatus.

In step S01, MvP table consisting of the mapping table M1 and the mapping table M2 based on management information collected from Layer-2 switches Sj by the network monitoring manager H is generated. Here, a mapping table of non-intelligent Hub SX is not generated in the MvP table because the network monitoring manager H cannot receive management information from non-intelligent Hub SX in which SNMP agent is not implemented.

As shown in FIG. 4, the mapping table M1 provides a mapping between MAC address M(C4) of the communication apparatus C4 and port information set Row{M(C4)}={P(S1,15), P(S2,1), P(S3,2)}.

Also, the mapping table M2 provides a mapping between MAC address M(S1) of Layer-2 switch S1 and port information set Row{M(S1)}={P(S2,1), P(S3,1)}, a mapping between MAC address M(S2) of Layer-2 switch S2 and port information set Row{M(S2)}={P(S1,15), P(S3,1)}, and a mapping between MAC address M(S3) of Layer-2 switch S3 and port information set Row{M(S3)}={P(S1,15), P(S2,1)}.

Next, In step S02, in case where the same port information is seen in both the port information set Row{M(C4)} of the mapping table M1 and the port information set Row{M(Sj)} of the mapping table M2, the MvP table is normalized by deleting elements P(Sj,n) corresponding to the said port information from the port information set Row{M(Sj)} of the mapping table M2.

In step S02, normalizing process is performed as follows. The element of port P(S2,1) is deleted from the port information set Row{M(S1)} of the mapping table M2, because the element of the same port P(S2,1) is seen in both the port information set Row{M(C4)} of the mapping table M1 and the port information set Row{M(S1)} of the mapping table M2.

Also, the element of port P(S1,15) is deleted from the port information set Row{M(S2)} of the mapping table M2, because the element of the same port information P(S1,15) is seen in both the port information set Row{M(C4)} of the mapping table M1 and the port information set Row{M(S2)} of the mapping table M2.

Also, the elements of port P(S1,15) and P(S2,1) are deleted from the port information set Row{M(S3)} of the mapping table M2, because the elements of the same port P(S1,15) and P(S2,1) are seen in both the port information set Row{M(C4)} of the mapping table M1 and the port information set Row{M(S3)} of the mapping table M2.

As shown in FIG. 4, the port information set Row{M(S3)} of the mapping table M2 is empty by normalizing process described above.

Next, In step S03, the Layer-2 switch S3 is identified as the Layer-2 switch connected to the communication apparatus C4 because the port information set Row{M(S3)} of the mapping table M2 is empty. Also, the port P(S3,2) is identified as the port connected to the communication apparatus C4 because the element of port P(S3,2) corresponding to the port information of the Layer-2 switches S3 identified above is seen in the port information set Row{M(C4)} of the mapping table M1.

Next, In step S04, the port P(S3,2) identified in step S03 is changed into disable state by administratively disabling the Layer-2 switch port P(S3,2) connected to the communication apparatus C4. For example, the network monitoring manager H executes the command for disabling the Layer-2 switch port P(S3,2). Thereby communication of the communication apparatus C4 is blocked.

As clarified above, in the network configuration including one or more non-intelligent Hub that is not corresponding to SNMP, the method and the program for carrying out "Execution Example 2" of the present invention is able to carry out detecting automatically the port information of Layer-2 switch connected to the communication apparatus that is identified as the target apparatus including illegal connection, and to carry out blocking communication of the target apparatus immediately and certainly by executing the step S01- S04 described above in case where illegal connection to the communication apparatus is detected in the network.

3. Execution Example 3

Figure 5:
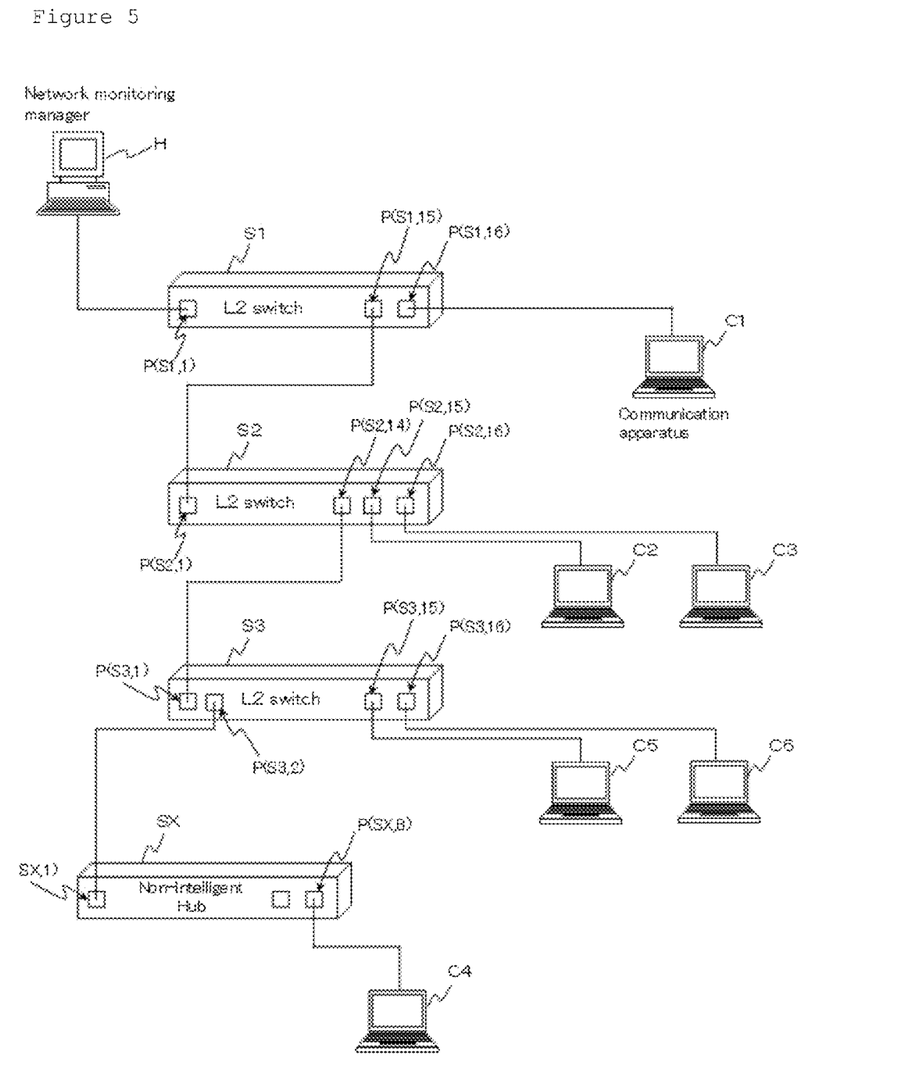
FIG. 5 shows an example of network configuration for carrying out "Execution Example 3" of the present invention.

The method and the program for carrying out "Execution Example 3" of the present invention are concretely explained with reference to the network configuration shown in FIG. 5. FIG. 5 shows an example of network configuration of the present invention, proposing the method and the program for controlling the communication of the target apparatus, specifically, blocking and unblocking the communication of the target apparatus, in case where a non-intelligent Hub that is not corresponding to SNMP exists in the network.

As shown in FIG. 5, the port P(S1,15) of Layer-2 switch S1 is connected to the port P(S2,1) of Layer-2 switch S2. Similarly, the port P(S2,14) of Layer-2 switch S2 is connected to the port P(S3,1) of Layer-2 switch S3. Similarly, the port P(S3,2) of Layer-2 switch S3 is connected the port P(SX,1) of non-intelligent Hub SX.

In this case, it is possible to carry out detecting automatically the Layer-2 switches ports connected to target apparatuses Ci and to carry out blocking communication of the target apparatus Ci immediately and certainly by executing the step described in FIG. 2 or FIG. 4.

That is, in the network configuration shown as FIG. 5, the method and the program for carrying out "Execution Example 3" of the present invention is able to carry out detecting automatically the Layer-2 switch port P(S3,2) connected to the communication apparatus C4 that is identified as the target apparatus including illegal connections, and to carry out blocking communication of the target apparatus C4 immediately and certainly by administratively disabling the Layer-2 switch port P(S3,2). In this case, the communication that has passed through ports of non-intelligent Hub SX is completely blocked by administratively disabling the Layer-2 switch port P(S3,2).

INDUSTRIAL APPLICABILITY

This invention is able to apply technology for immediately and certainly blocking communication of the communication apparatus in case where illegal connection to the communication apparatus is detected in the network arranged one or more Layer-2 switches.

What is claimed is:

1. A method for blocking communication of a target apparatus based on port information of one or more Layer-2 switches connected to communication apparatuses in a network, comprising of:
   a first step of generating a MvP table consisting of a mapping table M1 and a mapping table M2 based on management information collected from the Layer-2 switches by network monitoring manager,
   wherein said mapping table M1 provides a mapping between MAC address M(Ci) of the target apparatus Ci ($1 \leq i \leq$ total number of communication apparatuses in network) and port information set Row{M(Ci)} of Layer-2 switches Sj ($1 \leq j \leq$ total number of Layer-2 switches) that detected said MAC address M(Ci), and
   said mapping table M2 provides a mapping between MAC address M(Sj) of Layer-2 switches Sj and port information set Row{M(Sj)} of Layer-2 switches Sj that detected said MAC address M(Sj);
   a second step of normalizing the MvP table,
   wherein, if the same port is seen in both the port information set Row{M(Ci)} of the mapping table M1 and the port information set Row{M(Sj)} of the mapping table M2, the MvP table is normalized by deleting elements of ports P(Sj,n) ($1 \leq n \leq$ total number of ports of Layer-2 switches Sj) corresponding to the same port from the port information set Row{M(Sj)} of the mapping table M2;
   a third step of identifying the Layer-2 switch port connected to said target apparatus Ci based on the MvP table normalized in the second step;
   a fourth step of blocking the communication of said target apparatus Ci by administratively disabling the Layer-2 switch port connected to said target apparatus Ci based on the Layer-2 switch port identified in the third step.

2. The method according to claim 1, wherein the third step comprises of:
   (1) Identifying the Layer-2 switches Sj as the Layer-2 switch connected to the communication apparatus Ci in case where the port information set Row{M(Sj)} of the mapping table M2 is empty;
   (2) Identifying the port P(Sj,n) as the port connected to the communication apparatus Ci in the case where the element of the port P(Sj,n) corresponding to the port of the Layer-2 switches Sj identified in (1) is seen in the port information set Row{M(Ci)} of the mapping table M1.

3. The method according to claim 2, further comprising of:
   a fifth step of unblocking the communication of said target apparatus Ci by administratively enabling the Layer-2 switch port connected to said target apparatus Ci, in case where the Layer-2 switch port connected to said target apparatus Ci has been disabled.

4. The method according to claim 1, further comprising of:
   a fifth step of unblocking the communication of said target apparatus Ci by administratively enabling the Layer-2 switch port connected to said target apparatus Ci, in case where the Layer-2 switch port connected to said target apparatus Ci has been disabled.

5. A computer program embodied on a non-transitory computer readable medium of network monitoring manager to execute processes for blocking communication of a target apparatus based on port information of one or more Layer-2 switches connected to communication apparatuses in a network, comprising of:

a first executable process for generating a MvP table consisting of a mapping table M1 and a mapping table M2 based on management information collected from the Layer-2 switches by network monitoring manager, wherein said mapping table M1 provides a mapping between MAC address M(Ci) of the target apparatus Ci ($1 \leq i \leq$ total number of communication apparatuses in network) and port information set Row{M(Ci)} of Layer-2 switches Sj ($1 \leq j \leq$ total number of Layer-2 switches) that detected said MAC address M(Ci), and said mapping table M2 provides a mapping between MAC address M(Sj) of Layer-2 switches Sj and port information set Row{M(Sj)} of Layer-2 switches Sj that detected said MAC address M(Sj);

a second executable process for normalizing the MvP table, wherein, if the same port is seen in both the port information set Row{M(Ci)} of the mapping table M1 and the port information set Row{M(Sj)} of the mapping table M2, the MvP table is normalized by deleting elements of ports P(Sj,n) ($1 \leq n \leq$ total number of ports of Layer-2 switches Sj) corresponding to the same port from the port information set Row{M(Sj)};

a third executable process for identifying the Layer-2 switch port connected to said target apparatus Ci based on the MvP table normalized in the second executable process;

a fourth executable process for blocking the communication of said target apparatus Ci by administratively disabling the Layer-2 switch port connected to said target apparatus Ci based on the Layer-2 switch port identified in the third executable process.

6. The computer program according to claim 5, wherein the third executable process comprises of:
(1) Identifying the Layer-2 switches Sj as the Layer-2 switch connected to the communication apparatus Ci in case where the port information set Row{M(Sj)} of the mapping table M2 is empty;
(2) Identifying the port P(Sj,n) as the port connected to the communication apparatus Ci in the case where the element of the port P(Sj,n) corresponding to the port of the Layer-2 switches Sj identified in (1) is seen in the port information set Row{M(Ci)} of the mapping table M1.

7. The computer program according to claim 6, further comprising of:
a fifth executable process for unblocking the communication of said target apparatus Ci by administratively enabling the Layer-2 switch port connected to said target apparatus Ci, in case where the Layer-2 switch port connected to said target apparatus Ci has been disabled.

8. The computer program according to claim 5, further comprising of:
a fifth executable process for unblocking the communication of said target apparatus Ci by administratively enabling the Layer-2 switch port connected to said target apparatus Ci, in case where the Layer-2 switch port connected to said target apparatus Ci has been disabled.

\* \* \* \* \*